US006487731B1

United States Patent
Houde

(12) United States Patent
(10) Patent No.: US 6,487,731 B1
(45) Date of Patent: Dec. 3, 2002

(54) SELF-CLEANING, WASTE STORING, ODORLESS, ENVIRONMENTALLY FRIENDLY TOILET FOR HUMANS AND ANIMALS

(76) Inventor: James Houde, 31 Seaverns Bridge Rd., Merrimack, NH (US) 03054

( * ) Notice: Subject to any disclaimer, the term of this patent is extended or adjusted under 35 U.S.C. 154(b) by 0 days.

(21) Appl. No.: 09/966,625

(22) Filed: Oct. 1, 2001

(51) Int. Cl.[7] ............................................. A47K 11/00
(52) U.S. Cl. ...................................... 4/321; 4/DIG. 11
(58) Field of Search ............................ 4/321, DIG. 11, 4/317, 318, 323

(56) References Cited

U.S. PATENT DOCUMENTS

| 1,021,663 | A | * | 3/1912 | Cronk | 4/321 |
|---|---|---|---|---|---|
| 3,032,776 | A | * | 5/1962 | Obert et al. | 4/DIG. 11 |
| 3,829,909 | A | * | 8/1974 | Rod et al. | 4/DIG. 11 |
| 3,951,796 | A | | 4/1976 | Kemper | |
| 3,974,528 | A | * | 8/1976 | Claunch et al. | 4/DIG. 11 |
| 4,028,747 | A | | 6/1977 | Newton | |
| 4,050,102 | A | | 9/1977 | Kemper et al. | |
| 4,313,233 | A | | 2/1982 | Roberts | |
| 4,347,632 | A | | 9/1982 | Criss | |
| 5,711,037 | A | | 1/1998 | Reichardt et al. | |

FOREIGN PATENT DOCUMENTS

| FR | 2462521 | * | 3/1981 | 4/DIG. 11 |

* cited by examiner

*Primary Examiner*—Robert M. Fetsuga
(74) *Attorney, Agent, or Firm*—Lambert & Associates; Gary E. Lambert; Edward Timmer

(57) ABSTRACT

The present invention relates to oil toilets where oil is used as a sealant to isolate unpleasant smell produced by waste materials. Waste materials enter oil in the storage container and sink since both solid waste and urine have specific gravity that is higher than that of oil. Excess oil is collected in the overflow container. It has a component for collection of fumes that are formed by the waste materials collected in the toilet. A cleaning means is utilized to remove waste materials from the toilet while at the same time it could be modified to reuse a substantial amount of the oil present in the toilet.

31 Claims, 5 Drawing Sheets

SELF-CLEANING, WASTE STORING, ODORLESS, ENVIRONMENTALLY FRIENDLY TOILET FOR HUMANS AND ANIMALS

FIELD OF THE INVENTION

This invention relates to a waste storage systems and particularly to toilets for humans and pets.

Toilets have been in use for centuries. They provide a convenient way for attending to biological needs and for storing away of waste materials. However, most cat litter boxes are only marginally effective in isolation of unpleasant odors. This problem is also present in many types of portable toilets for human use. In addition, regular toilets used in people's homes operate on principle of using large amounts of water to flush waste products. Therefore, there exists a problem with prior art toilets due to a fact that they are either ineffective in containment of unpleasant odors or utilize a lot of water. In addition, most cat litter boxes require manual cleaning which exposes person cleaning them to unpleasant odors.

What is needed is a simple, easy to use toilet that could be modified to be used for either pets or humans and which would prevent escape of unpleasant odors into ambient environment. A desired toilet should use little or no water so as to conserve water supplies. Moreover, such toilet should be easy to clean, requiring minimal and simple maintenance.

SUMMARY OF THE INVENTION

This invention satisfies the above needs. A novel toilet is provided.

The claimed toilet is based on a principle of using any type of oil for containment of the waste materials. The oils is used as a sealant. Waste materials enter oil and sink since both solid waste and urine have specific gravity that is higher than that of oil. Thus there is creation of a layer of oil over the waste materials making oil into a sealant that prevents escape of unpleasant odors into the ambient environment. In addition, present invention is designed to collect excess oil to prevent it from spilling out of the toilet. It has a component for collection of fumes that are formed by the waste materials collected in the toilet. A cleaning means is utilized to remove waste materials from the toilet while at the same time allowing for reuse of a substantial amount of the oil.

BRIEF DESCRIPTION OF DRAWINGS

These and other features, aspects and advantages of the present invention will become better understood with reference to the following description, appended claims, and accompanying drawings where:

DESCRIPTION OF THE INVENTION

This invention represents a toilet for human and animal use.

Figure 5:
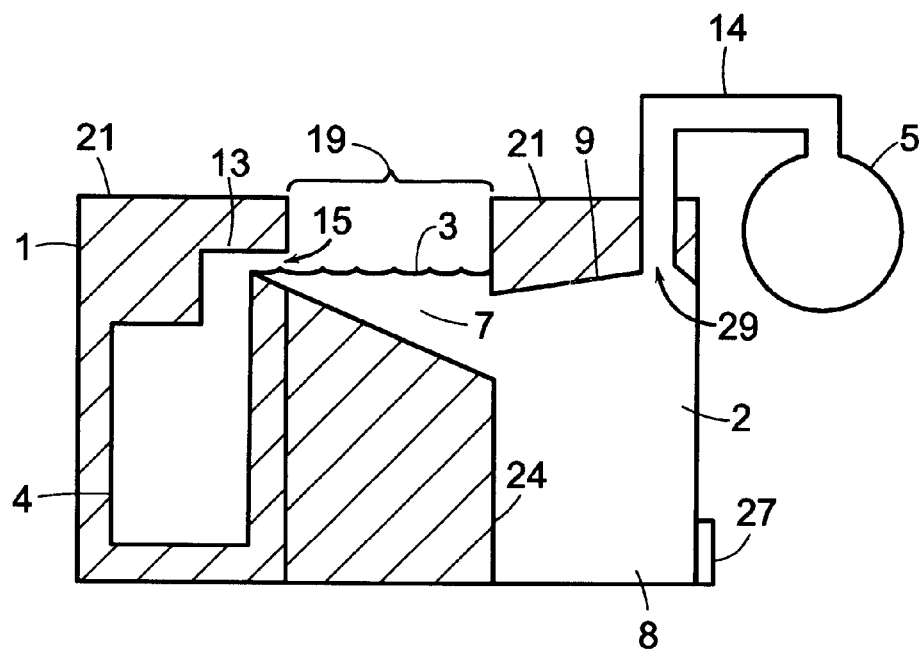
FIG. 5 is a cross sectional view of the preferred embodiment of the invention.
Figure 6:
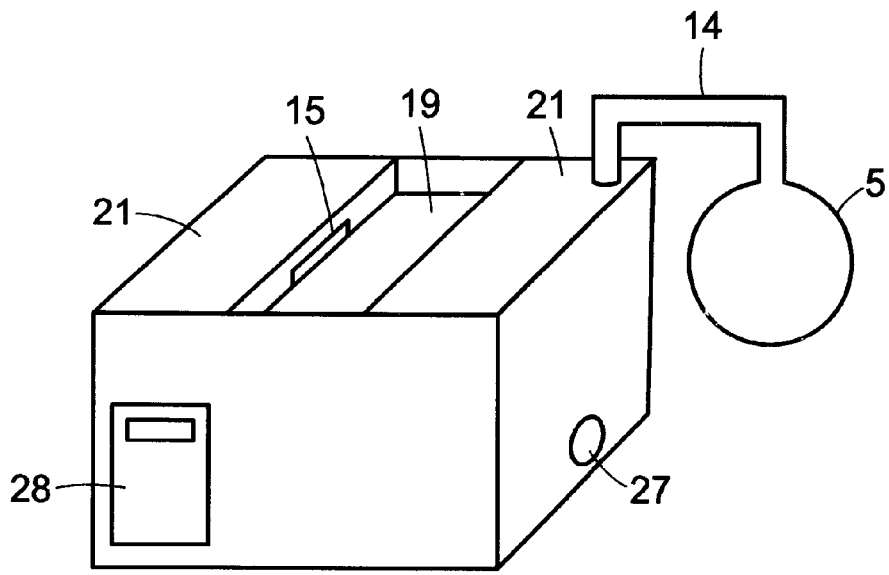
FIG. 6 is a perspective view of the preferred embodiment of the invention.
Figure 7:
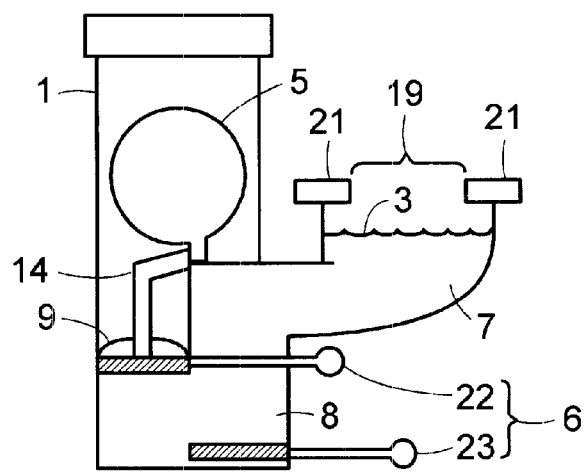
FIG. 7 is a cross sectional view of one of the embodiments of the invention that is suitable for human use.
Figure 8:
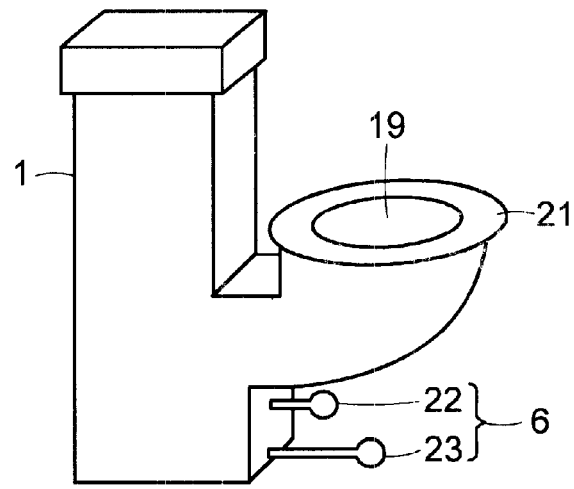
FIG. 8 is a perspective view of one of the embodiments of the invention that is suitable for human use.

Referring to FIGS. 1–8, the toilet housing 1 has a storage container 2, which in turn has an upper area 7 and a lower area 8. Sealant 3 is stored inside of the storage container 2 confined within the encasing walls 24. For sealant 3, oil is used since oil has a specific gravity that is lower than that of water thus allowing waste materials to sink to the bottom since urine is mostly water. Any kind of oil could be used with this invention There is a support platform 21 used for either placement of paws when the toilet is to be used by pets, or for sitting upon by people if the toilet is to be utilized for human use. One embodiment of the invention suitable for use by people is depicted in FIGS. 7 & 8.

The user, human or animal, would excrete biological waste materials over the waste receiving opening 19. The waste materials would enter the sealant 3 filled storage container 2 and sink to the bottom of the storage container 2. The encasing walls 24 could have a slopping shape in the upper area 7 of the storage container 2 so as to direct accumulation of sinking waste materials inside of the lower area 8 of the storage container 2 as depicted in FIGS. 1, 3, 5, and 7. As could be seen in FIG. 1, the encasing walls 24 of the upper area 7 of the storage container 2 could have a funnel shape with the wide end 26 of the funnel located at the waste receiving opening 19 while a narrow end 25 of the funnel at the mouth of the lower area 8 of the storage container 2.

As waste materials accumulate inside of the storage container 2, sealant 3 is being displaced and the level of sealant 3 rises inside of the storage container 2. To prevent overflowing and spillage of sealant 3, an overflow collecting aperture 15 is positioned on the encasing wall 24 in the upper region of the upper area 7 of the storage container 2. The excess sealant 3 enters the overflow collecting aperture 15 and is transported by force of gravity into an overflow container 4 via an overflow conduit 13.

Figure 1:
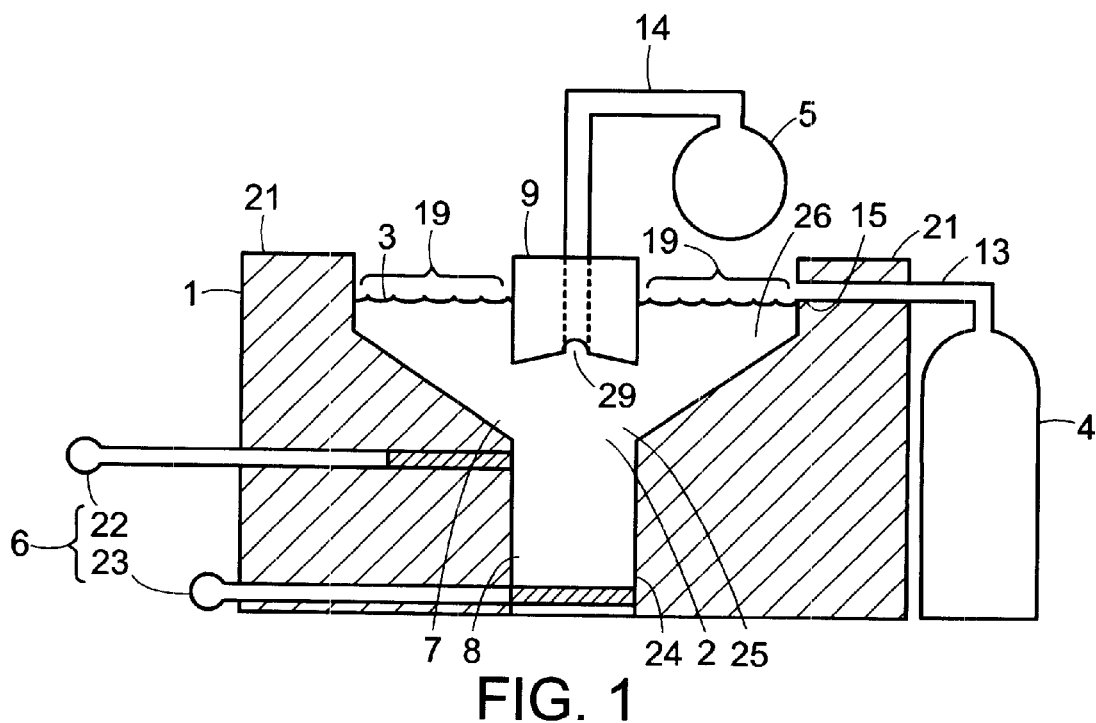
FIG. 1 is a cross sectional view of one of the embodiments of the invention.
Figure 2:
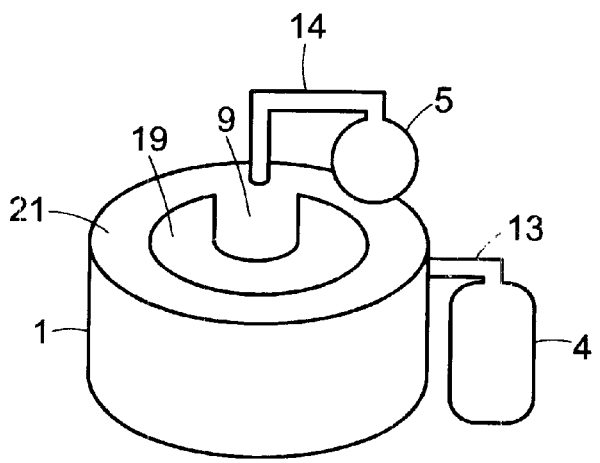
FIG. 2 is a perspective view of one of the embodiments of the invention.

As various fumes form from the decomposition of the waste materials, they bubble up and rise up. These fumes then become collected in a fume container 5. A rubber balloon could be used as a fume container 5. The fume collecting aperture 29 is submerged below the surface of the sealant 3 as depicted in FIGS. 1 & 5. At first, fumes enter the fume collecting aperture 29 on the fume collecting end 9 positioned over the storage container 2. The fume collecting end 9 is in liquid communication with a fume conduit 14. The fumes then move up along the fume conduit 14. The fume conduit 14 is also in liquid communication with the fume container 5 and, therefore, the fumes accumulate in the flume container 5. In an embodiment shown in FIGS. 1 & 2, the fume collecting end 9 has a diameter equal to that of the width of the lower area 8 of the storage container 2 and the fume collecting end 9 is positioned over the lower area 8 of the storage container 2 in order to optimize fume accumulation in the fume container 5.

There is also a mechanism for removal of waste materials from the toilet. A cleaning means 6 is used to empty out waste materials together with some sealant 3. A cleaning means 6 could be any type of means well known in the art that would allow for removal of the contents of the lower area 8 of the storage container 2 while at the same time preventing discharge of the sealant 3 present in the upper area 7 of the storage container 2. This ensures economical use of the sealant 3.

One possible cleaning means 6 utilizes two valves, a stop valve 22 and a discharge valve 23 depicted in FIGS. 1 & 7.

During normal operation of the toilet, the stop valve 22 is disengaged allowing for waste materials to accumulate on the bottom of the lower area 8 of the storage container 2. Meanwhile, the discharge valve 23 is engaged to prevent spillage of the contents of the storage container 2 out of the toilet. Then during cleaning, the stop valve 22 is engaged to compartmentalize sealant 3 present inside of the upper area 7 of the storage container 2. Next, the discharge valve 23 is disengaged allowing for the contents of the lower area 8 of the storage container 2 (sealant 3 and waste materials) to spill out of the toilet. After the cleaning is done, the discharge valve 23 is engaged, the stop valve 22 is disengaged and necessary additional amount of sealant 3 is added to the storage container 2.

Figure 3:
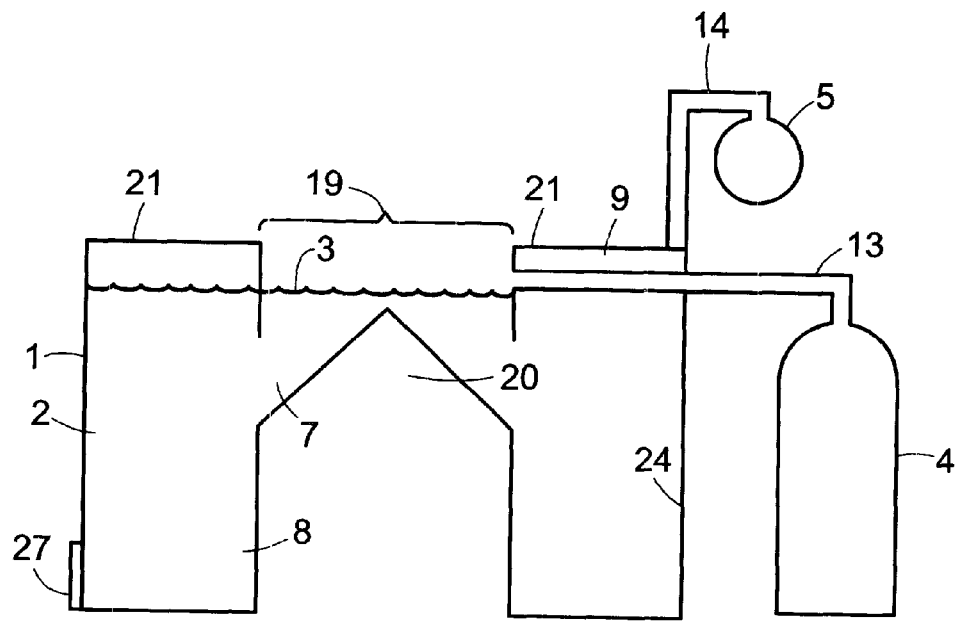
FIG. 3 is a cross sectional view of one of the embodiments of the invention.
Figure 4:
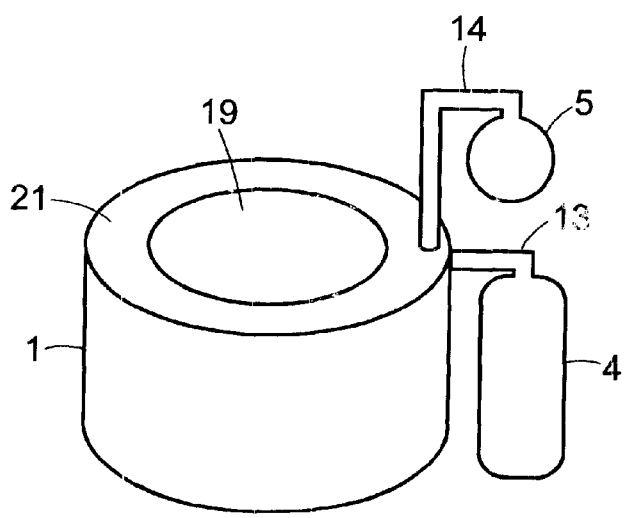
FIG. 4 is a perspective view of one of the embodiments of the invention.

In an alternative embodiment, the cleaning means 6 could be replaced by a drain plug 27 depicted in FIGS. 3, 5, and 6. Opening of the drain plug 27 allows for release of contents of the storage container 2 since the drain plug 27 is positioned at the bottom of the lower area 8 of the storage container 2. The waste materials are removed together with the sealant 3 and the toilet is ready for use after being filled with replacement sealant 3. The sealant 3 could be recycled since most if not all of the sealant 3 discarded together with waste materials could be separated from the waste materials and re-used in the toilet. The separation could be achieved by such simple means as slow pouring of the sealant 3 out of any waste container such as a bucket. The waste materials made up of urine and feces will remain at the bottom since they have a specific gravity that is higher than that of the sealant 3 while sealant 3 is poured out for re-use.

Figure 9:
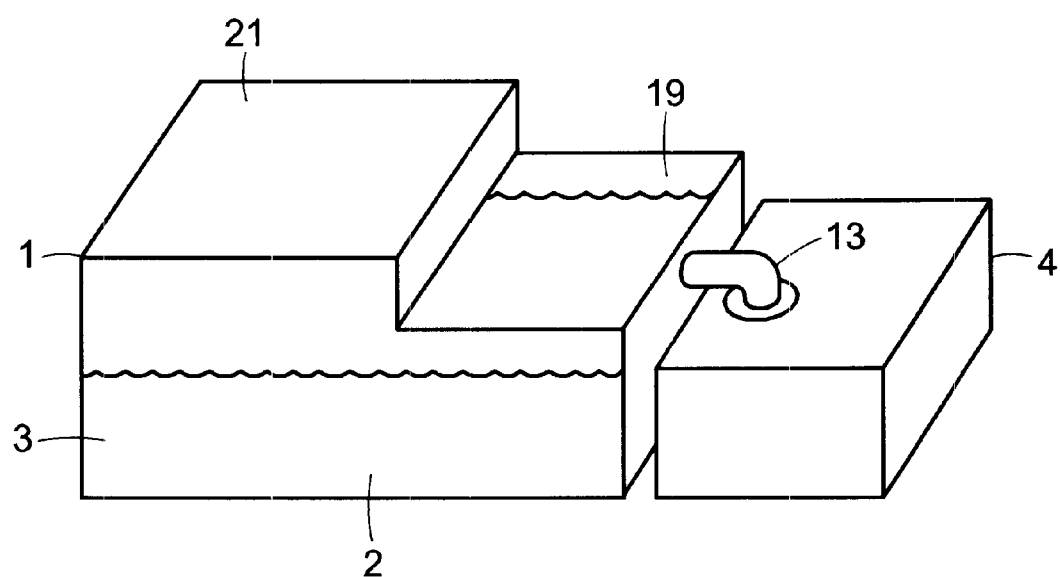
FIG. 9 is a perspective view of one of the embodiments of the invention.

In an alternative embodiment shown in FIG. 9, cleaning could be achieved with ease by lifting one side of the toilet housing 1, the side that is at the greatest distance away from the overflow container 4. Here, the overflow conduit 13 is made out of a solid non-flexible material and it acts as a secure structural connection between the toilet housing 1 and the overflow container 4. Upon lifting of the side of the toilet housing 1 which is at the greatest distance away from the overflow container 4, the sealant 3 inside of the storage container 2 will flow into the overflow container 4 through the overflow conduit 13. The overflow container 4 has to have a capacity that is large enough to accept most of the sealant from the storage container 2. After this transfer of sealant 3 from the storage container 2 to the overflow container 4 is achieved the toilet housing 1 is returned to its normal horizontal position. Now the waste materials remaining inside of the storage container 2 could be cleaned out. Another lift, this time of the overflow container 4 end of the toilet returns the sealant 3 into the storage container 2. Now the toilet is cleaned and ready to be reused.

DESCRIPTION OF THE PREFERRED EMBODIMENTS

A preferred embodiment of the invention is depicted in FIGS. 5 & 6. In this embodiment, the fume collecting end 9 is positioned directly above the lower area 8 of the storage container 2 so as to accumulate fumes created on the bottom of the lower area 8 by the waste materials. Furthermore, the lower area 8 is positioned at a vertical axis displacement away from the waste receiving opening 19 (which arrangement is also depicted in FIGS. 3, 5, and 7). This arrangement allows for having a waste receiving opening 19 that is not obscured by the fume collecting end 9. As could be seen in FIG. 5, the encasing wall 24 of the storage container 2 has a sloped shape in the upper area 7 of the storage container 2, so as to direct accumulation of the sinking waste materials in the lower area 8 of the storage container 2. Alternatively, as depicted in FIG. 3, a conical body 20 could be placed in the center of the storage container 2 so as to direct accumulation of waste materials at a vertical axis displacement from the waste receiving opening 19.

A tray 28, depicted in FIG. 6, could be used to slide out contents of the overflow container. This allows for easy removal of the accumulated excess sealant 3.

As could be seen from FIGS. 5 & 6, the preferred embodiment integrates all the essential components of the invention within a single box-like structure. The depicted placement of the support platforms 21 and the waste receiving end 19 is believed to be optimal for use by such pets as cats.

What I claim is:

1. A waterless toilet comprising:
   a toilet housing having a support platform, a waste receiving opening, and a storage container wherein the storage container has an encasing wall, an upper area, and a lower area;
   a sealant with a specific gravity lower than that of water stored within the storage container of the toilet housing;
   a cleaning means for removing waste materials from the storage container of the toilet housing and for retrieval of the sealant for re-use; and
   a fume container in liquid communication with the storage container of the toilet housing.

2. The waterless toilet of claim 1 wherein:
   the encasing wall of the upper area of the storage container has a funnel shape with a wide end being the waste receiving opening and a narrow end in liquid communication with the lower area of the storage container wherein the lower area of the storage container has a cylindrical shape.

3. The waterless toilet of claim 2 wherein:
   the fume collecting end has a diameter equal to that of the width of the lower area of the storage container and the flume collecting end is positioned over the lower area of the storage container.

4. The waterless toilet of claim 1 wherein:
   a sealant is any type of liquid oil which has a specific gravity lower than that of water.

5. The waterless toilet of claim 1 wherein:
   the cleaning means is composed of a stop valve and a discharge valve, both positioned in the lower area of the storage container of the toilet housing.

6. The waterless toilet of claim 5 wherein:
   during normal operation of the toilet, the stop valve is disengaged to allow waste materials to collect in the lower area of the storage container while the discharge valve is engaged to prevent disposal of the sealant and the waste products from the storage container.

7. The waterless toilet of claim 5 wherein:
   during cleaning, the stop valve is engaged to prevent disposal of the sealant from the upper area of the storage container while the discharge valve is disengaged to allow disposal of the sealant and waste materials from the lower area of the storage container.

8. The waterless toilet of claim 1 wherein:
   a conical body is centrally positioned within the storage container of the toilet housing with the waste receiving opening positioned directly above the conical body and wherein the waste receiving opening has same diameter as that of the base of the conical body.

9. The waterless toilet of claim 1 further comprising:
   an overflow container in liquid communication with the storage container of the toilet housing.

10. The waterless toilet of claim 9 further comprising:
    an overflow conduit having an overflow collecting aperture, in liquid communication with the upper area of the storage container wherein the overflow conduit is in liquid communication with the overflow container, thereby allowing for excess sealant to accumulate inside of the overflow container.

11. The waterless toilet of claim 9 wherein:

the overflow container has a tray for removal of excess sealant.

12. The waterless toilet of claim 1 further comprising:

a fume conduit having a fume collecting end with a fume collecting aperture positioned in the storage container, wherein the fume collecting end is in liquid communication with the fume conduit and wherein the fume conduit is also in liquid communication with the fume container thereby allowing for fumes present in the storage container to collect inside of the fume container.

13. The waterless toilet of claim 12 wherein:

the fume collecting aperture is submerged below the surface of the sealant.

14. The waterless toilet of claim 1 wherein:

the encasing wall of the storage container has a sloped shape in the upper area of the storage container, so as to direct accumulation of the sinking waste materials in the lower area of the storage container.

15. A waterless toilet comprising:

a toilet housing having a support platform, a waste receiving opening, and a storage container wherein the storage container has an encasing wall, an upper area, and a lower area;

a sealant with a specific gravity lower than that of water stored within the storage container of the toilet housing;

a cleaning means for removing waste materials from the storage container of the toilet housing and for retrieval of the sealant for re-use; and an overflow container in liquid communication with the storage container of the toilet housing, wherein the overflow container has a tray for removal of excess sealant.

16. The waterless toilet of claim 15 wherein:

a sealant is any type of liquid oil which has a specific gravity lower than that of water.

17. The waterless toilet of claim 15 wherein:

the cleaning means is composed of a stop valve and a discharge valve, both positioned in the lower area of the storage container of the toilet housing.

18. The waterless toilet of claim 17 wherein:

during normal operation of the toilet, the stop valve is disengaged to allow waste materials to collect in the lower area of the storage container while the discharge valve is engaged to prevent disposal of the sealant and the waste products from the storage container.

19. The waterless toilet of claim 17 wherein:

during cleaning, the stop valve is engaged to prevent disposal of the sealant from the upper area of the storage container while the discharge valve is disengaged to allow disposal of the sealant and waste materials from the lower area of the storage container.

20. The waterless toilet of claim 15 wherein:

a conical body is centrally positioned within the storage container of the toilet housing with the waste receiving opening positioned directly above the conical body and wherein the waste receiving opening has same diameter as that of the base of the conical body.

21. The waterless toilet of claim 15 further comprising:

an overflow conduit having an overflow collecting aperture, in liquid communication with the upper area of the storage container wherein the overflow conduit is in liquid communication with the overflow container, thereby allowing for excess sealant to accumulate inside of the overflow container.

22. The waterless toilet of claim 15 further comprising:

a fume container in liquid communication with the storage container of the toilet housing.

23. The waterless toilet of claim 22 further comprising:

a fume conduit having a fume collecting end with a fume collecting aperture positioned in the storage container, wherein the fume collecting end is in liquid communication with the fume conduit and wherein the fume conduit is also in liquid communication with the fume container thereby allowing for fumes present in the storage container to collect inside of the fume container.

24. The waterless toilet of claim 23 wherein:

the fume collecting aperture is submerged below the surface of the sealant.

25. The waterless toilet of claim 15 wherein:

the encasing wall of the storage container has a sloped shape in the upper area of the storage container, so as to direct accumulation of the sinking waste materials in the lower area of the storage container.

26. A waterless toilet comprising:

a toilet housing having a support platform, a waste receiving opening, and a storage container wherein the storage container has an encasing wall, an upper area, and a lower area;

a sealant with a specific gravity lower than that of water stored within the storage container of the toilet housing;

an overflow container in liquid communication with the storage container of the toilet housing;

a fume container in liquid communication with the storage container of the toilet housing;

a cleaning means for removing waste materials from the storage container of the toilet housing.

27. The waterless toilet of claim 26 further comprising:

a fume conduit having a fume collecting end with a fume collecting aperture positioned in the storage container, wherein the fume collecting end is in liquid communication with the fume conduit and wherein the fume conduit is also in liquid communication with the fume container thereby allowing for fumes present in the storage container to collect inside of the fume container.

28. The waterless toilet of claim 27 wherein:

the fume collecting aperture is submerged below the surface of the sealant.

29. The waterless toilet of claim 26 further comprising:

an overflow conduit having an overflow collecting aperture, in liquid communication with the upper area of the storage container wherein the overflow conduit is in liquid communication with the overflow container, thereby allowing for excess sealant to accumulate inside of the overflow container.

30. The waterless toilet of claim 26 wherein:

the encasing wall of the storage container has a sloped shape in the upper area of the storage container, so as to direct accumulation of the sinking waste materials in the lower area of the storage container.

31. The waterless toilet of claim 30 wherein:

the lower area of the storage container has vertical encasing walls wherein the fume collecting end is positioned above the width of the lower area of the storage container.

* * * * *